2,924,520

COMPOSITION FOR PRINTING SCREENS

Walter A. Leeds and Norbert J. Sweete, Chicago, Ill.

No Drawing. Application June 25, 1956
Serial No. 593,371

4 Claims. (Cl. 96—35)

This invention relates to the preparation of direct photo stencils for reproducing art work on printing screens, commonly referred to as "silk screens." Heretofore the successful preparation of silk screen stencils has been painstaking and usually required the ability of a professional person. Preparation of other screen stencil materials, exposure times, development techniques and the quality of the art work were all critical in providing reproduceable results in accordance with the prior art. All of these factors had to be accurately controlled. In many instances, expensive photographic equipment was required in the production of the stencils.

The primary object of the present invention is to provide a novel composition for coating silk screens or the like which can be used successfully by unskilled persons, capable of following simple instructions, in preparing silk screens of consistently good quality.

Another object is to provide light-sensitive coating compositions which, after exposure, are characterized by excellent resistance to water and to any type of ink or paint that is customarily employed in silk screen printing, including water soluble inks, enamels, lacquers and textile inks.

Another object is to provide a coating composition which, after exposure to light and use in a silk screen, may be digested to completely remove it from the screen so that the screen can be salvaged for reuse.

Another object is to provide a silk screen coating composition which, after application to the screen fabric and drying, becomes light-sensitive and has a relatively long storage life when stored away from the light at ordinary room temperature and humidity.

A further object is to provide a simple, foolproof process for making silk screen stencils using the improved coating compositions of the invention.

The process of the invention includes the steps of coating a screen fabric with a particular light-sensitive aqueous solution of a gelatinous material; exposing the portions of the coating, which are to become insoluble to the light; and developing or washing out the unexposed portions which remain water soluble.

The novel coating compositions of the invention consist essentially of about 85 parts by weight of a gelatinous material, such as dehydrated powdered protein, having a bloom jelly strength of about 500 grams, and about 15 parts of potassium dichromate. In a preferred composition between 1 and 2 parts of a green anthraquinone dye is substituted for a like quantity of potassium dichromate. The protein material used is granular in form (about 28 mesh) and preferably is derived from animal hides. The relative proportions of the respective ingredients are very critical and should not be varied more than plus or minus 5% from the values recited if the desired results are to be achieved. It is also important that the gel strength of the protein be in excess of 400 grams, with the 500 gram bloom value mentioned being preferred. Anthraquinone green, in solution, has a pH close to that of potassium dichromate and aids in providing the proper degree of acidity in the sensitizing solution. Green is recognized as a color that has great light absorption qualities. The light absorption qualities of the green color allows maximum penetration of the dried coating by ultra violet radiation. This efficient usage of ultra violet radiation allows full activation of the dichromate and thereby produces the desired tanning action upon the protein. This successful tanning of the protein by the dichromate, aided by the absorption qualities of the green color, represents one of the prime objectives of our invention. The anthraquinone green is known in the trade as "D & C (Drug and Cosmetic) Green No. 5" and may be identified chemically as the disodium salt of 1,4-bis(o-sulfo-p-toluino) anthraquinone.

The dry homogeneous coating composition prepared in the proportions indicated is dissolved in hot water, say, 175° to 212° F., to provide a sensitizing solution having 12.73% solids. The sensitizing solution is brought about by vigorously agitating the water and the dry composition. Any screen fabric, such as silk, nylon, Vinyon, rayon, organdy or metal may be used. In accordance with conventional silk screening technique, the fabrics are carefully and tightly stretched to the screen fabric frame. Where very fine detail is desired, high mesh count silk should be employed, but for the average job organdy is satisfactory. If metal screen fabric is employed, the fabric should be cleaned to remove any oil before coating is attempted. The sensitizing solution, as above prepared, is then brushed onto the screen or applied in any other suitable manner to fill in completely the interstices thereof. The coating may be smoothed out with a squeegee or other straight edge. This operation should be carried out in subdued light. The screen is then allowed to dry undisturbed. Drying may be hastened by blowing warm air over the screen, or otherwise. Drying may be effected in about 45 minutes. After the first coat is dry, a second coat should be applied to insure complete coverage. Usually two coats are sufficient to preclude pinholes. More may be used if desired or necessary because of the weave of the fabric.

The compound which has dried on the screen is light sensitive, and if the sensitized screen is not going to be exposed promptly in producing art work, it should be stored away from the light, as in a black envelope or dark cabinet. One important advantage of our invention is that such screens may be prepared in advance and stored for periods up to six weeks without decreasing the sensitivity thereof to light.

The next step in the process of preparing the silk screen involves exposing the dried compound to light through the art work. The art work is generally prepared on a suitable transparent surface with the subject matter or design applied in dark opaque lines. India ink on a cellulose sheet has proved highly satisfactory. The opaque portions of the art work block the light and the coating beneath these portions remains water soluble. The other areas which are exposed to light become tanned by chemical reaction between the dichromate salt and the protein. This reaction is brought about by the presence of light. The light source employed may be a commercially-available No. 2 photo-flood bulb or a 200 watt frosted bulb with reflector. The time of exposure will vary, depending upon the concentration of the light source and the size of the screen. A 12" by 12" screen, for example, may be exposed in about 15 minutes using a No. 2 photoflood bulb at a distance of 36". With a 200 watt bulb, the distance should be decreased to about 18" to accomplish the same result. Larger screens require additional lamps or additional time. Care should be taken so that the exposure is uniform over the entire area of the screen. Carbon arc lamps may also be used as a source of radiant energy for exposing the coating. In such case, the exposure time may vary between three and seven minutes. If the art work is properly prepared and held firmly in contact with the coated fabric, there is no problem with respect to over-exposure. If there is any doubt as to whether the exposure is adequate, the exposure time should be extended.

After exposure, the next step is to develop the exposed screen. This is done by running water over the surface of the screen, the temperature of the water being about 110° F. Best results are achieved by holding the screen at about a 45° angle to the direction of the stream. The force of the stream may be fairly strong and occasionally gently rubbing the unexposed area with one's finger will aid in washing out the pattern or design and in releasing the undesired and unexposed material. After the design appears and developing has been completed, the screen may be blotted with a soft absorbent cloth or paper towel. Residual moisture may be evaporated more quickly by using compressed air. The screen after drying is ready for use in printing in accordance with conventional practice.

One of the important features of our invention permits the coating material to be removed from the screen so that the screen may be reused. This is accomplished by soaking the screen in an aqueous solution containing 1% of a proteolytic enzyme, such as erypsin. Other enzymes capable of digesting protein may be used. All of the coating will decompose and separate from the screen within 2–6 hours under action of the enzyme solution. The enzyme solution, of course, will not harm any of the ordinary materials from which the screen fabrics are made. After the coating has been completely solubilized, the screen should be thoroughly rinsed with water and allowed to dry before reuse.

Silk screens prepared in accordance with the invention exhibit remarkable resistance to moisture. It is not necessary to provide a water insoluble coating, such as a lacquer or the like, to protect the surface of the stencil. This permits use of water-base screen process inks as well as inks which are prepared using organic solvents.

A specific example illustrating a preferred composition for screen coatings is as follows:

| | Percent by weight |
|---|---|
| Animal protein derived from animal hide (28 mesh, bloom jelly strength 500) | 85.39 |
| Potassium dichromate (U.S.P. reagent grade) | 12.99 |
| Dye (D & C Green No. 5) | 1.62 |

These materials are thoroughly mixed in the dry state and are not prepared in physical solution until immediately prior to coating the screen. The composition of this example may be used in carrying out the process above described with excellent results.

Although we have described a preferred composition and a preferred method for employing our composition in making silk screen stencils, it will be apparent to those skilled in the art that various modifications may be made without departing from the true spirit and scope of the invention. It is, therefore, our intention not to limit the invention other than as necessitated by the scope of the appended claims.

We claim as our invention:

1. A composition capable of being prepared in the form of an aqueous solution for coating screen fabrics in the preparation of stencils which consists essentially of about 85 parts of powdered protein derived from animal hide having a bloom jelly strength in excess of 400 grams and correspondingly about 15 parts of potassium dichromate, said parts being by weight.

2. A composition capable of being prepared in the form of an aqueous solution for coating screen fabrics in the preparation of stencils which consists essentially of about 85 parts of powdered protein derived from animal hide having a bloom jelly strength of about 500 grams, about 13 parts of potassium dichromate and from 1 to 2 parts of the disodium salt of 1,4-bis(o-sulfo-p-toluino) anthraquinone, said parts being by weight.

3. A composition capable of being prepared in the form of an aqueous solution for coating screen fabrics in the preparation of stencils which consists essentially of 85.39 parts of protein derived from animal hide having a particle size of about 28 mesh and a bloom jelly strength of about 500 grams, 12.99 parts of potassium dichromate and 1.62 parts of the disodium salt of 1,4-bis(o-sulfo-p-toluino) anthaquinone, said parts being by weight.

4. A method for preparing a screen fabric stencil for printing which comprises preparing an aqueous solution from a composition consisting essentially of about 85 parts of powdered protein derived from animal hide having a bloom jelly strength of about 500 grams, about 13 parts of potassium dischromate and from 1 to 2 parts of the disodium salt of 1,4-bis(o-sulfo-p-toluino) anthraquinone, said parts being by weight, applying said solution to a screen fabric to completely fill the interstices thereof, permitting the coating to dry, exposing preselected areas of said dried coating to light to tan the gelatinous material by reaction with the dichromate to render it water insoluble, and developing the screen by washing out the remaining water soluble portions of the coating from said preselected insoluble areas to provide openings through the screen for the passage of ink therethrough.

References Cited in the file of this patent

UNITED STATES PATENTS

| 1,597,899 | Keel | Aug. 31, 1926 |
| 2,064,764 | Playford et al. | Dec. 15, 1936 |
| 2,604,388 | Staehle | July 22, 1952 |
| 2,716,060 | Lupo | Aug. 23, 1955 |

FOREIGN PATENTS

| 604,696 | Great Britain | July 8, 1948 |

OTHER REFERENCES

Industrial & Eng. Chem. (anal. ed.), vol. 2, 1930, pp. 348–351.

Kosloff: "Screen Process Printing," Signs of the Times Publishing Co., Cincinnati, Ohio (1950). (Copy in Scientific Library.)

Hiett et al.: "Silk-Screen Process Reproduction," Blandford Press Ltd., London, 3rd edition (1950).